United States Patent
Jun et al.

(10) Patent No.: US 8,787,847 B2
(45) Date of Patent: Jul. 22, 2014

(54) APPARATUS AND METHOD FOR CALIBRATION OF TRANSMITTER IN COMMUNICATION DEVICE

(75) Inventors: Si-Bum Jun, Hwaseong-si (KR); In-Yup Kang, Nonsan-si (KR); Min-Goo Kim, Hwaseong-si (KR); Chang-Joon Park, Suwon-si (KR); Won-Suk Choi, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 185 days.

(21) Appl. No.: 13/549,937

(22) Filed: Jul. 16, 2012

(65) Prior Publication Data
US 2013/0163695 A1    Jun. 27, 2013

(30) Foreign Application Priority Data
Dec. 26, 2011 (KR) .......................... 10-2011-0142209

(51) Int. Cl.
*H04B 17/00* (2006.01)
*H04L 25/49* (2006.01)

(52) U.S. Cl.
CPC ............ *H04B 17/0015* (2013.01); *H04L 25/49* (2013.01)
USPC ......................... 455/115.2; 455/125; 455/129

(58) Field of Classification Search
CPC ........... H04B 17/0015; H04B 17/0052; H04L 25/0266; H04L 25/0278; H04L 25/49; H04W 52/06; H04W 52/16; H04W 52/367
USPC ............. 455/67.11, 67.14, 115.1, 115.2, 121, 455/125, 126, 127.1, 129; 375/219, 221, 375/224, 229, 295, 296
See application file for complete search history.

(56) References Cited

U.S. PATENT DOCUMENTS

| | | | |
|---|---|---|---|
| 5,715,526 A | | 2/1998 | Weaver, Jr. et al. |
| 7,190,933 B2 * | | 3/2007 | De Ruijter et al. ............ 455/125 |
| 7,933,567 B2 | | 4/2011 | Guda et al. |
| 2002/0025789 A1 * | | 2/2002 | Hayashihara .................. 455/115 |
| 2006/0088087 A1 * | | 4/2006 | Gondi et al. ................... 375/229 |
| 2009/0318102 A1 | | 12/2009 | Someya |
| 2013/0064271 A1 * | | 3/2013 | van de Beek et al. .......... 375/219 |
| 2013/0244583 A1 * | | 9/2013 | Dhayni ....................... 455/67.14 |

FOREIGN PATENT DOCUMENTS

EP    1223681 A1    7/2002

* cited by examiner

*Primary Examiner* — Thanh Le
(74) *Attorney, Agent, or Firm* — Jefferson IP Law, LLP

(57) ABSTRACT

A method and an apparatus for calibration of a transmitter not having a Surface Acoustic Wave (SAW) filter are provided. The apparatus includes a calibration unit for outputting a detuning signal by which a resonance frequency of a Radio Frequency (RF) circuit is detuned with respect to a transmit operating frequency, and an RF unit for changing the resonance frequency according to the detuning signal and for outputting an out-of-band noise and a transmit signal having a relatively lower power than that of a case where the resonance frequency and the transmit operating frequency are tuned to each other.

22 Claims, 5 Drawing Sheets

APPARATUS AND METHOD FOR CALIBRATION OF TRANSMITTER IN COMMUNICATION DEVICE

PRIORITY

This application claims the benefit under 35 U.S.C. §119 (a) of a Korean patent application filed in the Korean Intellectual Property Office on Dec.26, 2011 and assigned Serial No. 10-2011-0142209, the entire disclosure of which is hereby incorporated by reference.

BACKGROUND OF THE INVENTION

1. Field of the Invention

The present invention relates to use of a transmitter in a communication system. More particularly, the present invention relates to calibration of a transmitter.

2. Description of the Related Art

In the case of a transmitter/receiver using Frequency Division Duplexing (FDD), noise generated in a Radio Frequency (RF) circuit of the transmitter has an effect on transmission/reception performance. Among the noise generated in the transmitter, an out-of-band noise, more particularly, a noise located in a receive band, increases a noise floor of the receiver, which results in deterioration of reception sensitivity. At present, by inserting an external fixed frequency Surface Acoustic Wave (SAW) filter between the RF circuit and a Power Amplifier Module (PAM) in order to remove the noise having an effect on the receiver, the transmitter RF circuit used in a portable terminal suppresses the increase of the noise floor by the use of the SAW filter, and allows a unique noise characteristic of the PAM to be maintained. The RF circuit can be called an RF Integrated Circuit (RFIC). In this case, the noise floor of the PAM is preferably designed to be low enough to prevent deterioration of the reception sensitivity of the receiver.

Systems of various standards and frequencies have recently been developed for mobile communication systems. In addition, various efforts have been made to include the systems of various standards and frequencies in one terminal by using a recently developed transmitter RF circuit. In case of using a terminal that supports a multi-mode and a multi-band, when the conventional transmitter structure is used, it is required to have a plurality of external, fixed frequency SAW filters according to the different frequencies to be supported. This causes an increase in the overall system size and an increase in the manufacturing cost. Therefore, a technique for removing the external, fixed frequency SAW filters while supporting the multi-mode and the multi-band has recently emerged as an issue in the manufacturing of the terminal.

However, since the transmitter RF circuit takes a role as a signal source, it must be implemented according to a correct requirement standard. If the SAW filters located between the RF circuit and the PAM are removed without any supplemental measures, an out-of-band noise of the transmitter RF circuit is directly delivered to the PAM. As a result, the noise is amplified due to an out-of-band gain of the PAM, and an output of the PAM may have significant noise. A magnitude of the amplified noise of the transmitter RF circuit significantly surpasses a magnitude of a unique output noise of the PAM, and thus reception sensitivity deterioration caused by the rising of the noise floor of the receiver still remains as a problem.

As described above, although there is a desire to decrease a device size and a manufacturing cost by removing the SAW filters, the removal of the SAW filters causes a problem in that the out-of-band noise of the transmitter is significantly increased. Accordingly, there is a need for a method for effectively removing the out-of-band noise.

SUMMARY OF THE INVENTION

Aspects of the present invention are to address at least the above-mentioned problems and/or disadvantages and to provide at least the advantages described below. Accordingly, an aspect of the present invention is to provide an apparatus and method for suppressing noise that is generated due to the absence of a Surface Acoustic Wave (SAW) filter in a communication device.

Another aspect of the present invention is to provide an apparatus and method for performing calibration by considering a noise in a transmitter of a communication device not having a SAW filter (i.e., a SAW-less communication device).

Yet another aspect of the present invention is to provide an apparatus and method for performing calibration by considering a noise and an output power in a transmitter of a SAW-less communication device.

Still another aspect of the present invention is to provide an apparatus and method for attenuating an output power without occurrence of additional noise in a transmitter of a communication device.

Another aspect of the present invention is to provide an apparatus and method for attenuating an output power without a resistance circuit in a transmitter of a communication device.

In accordance with an aspect of the present invention, a communication apparatus is provided. The apparatus includes a calibration unit for outputting a detuning signal by which a resonance frequency of a Radio Frequency (RF) circuit is detuned with respect to a transmit operating frequency, and an RF unit for changing the resonance frequency according to the detuning signal and for outputting an out-of-band noise and a transmit signal having a relatively lower power than that of a case where the resonance frequency and the transmit operating frequency are tuned to each other.

In accordance with another aspect of the present invention, a method for calibration of a communication device is provided. The method includes outputting a detuning signal by which a resonance frequency of an RF circuit is detuned with respect to a transmit operating frequency, changing the resonance frequency according to the detuning signal, and outputting an out-of-band noise and a transmit signal having a relatively lower power than that of a case where the resonance frequency and the transmit operating frequency are tuned to each other.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
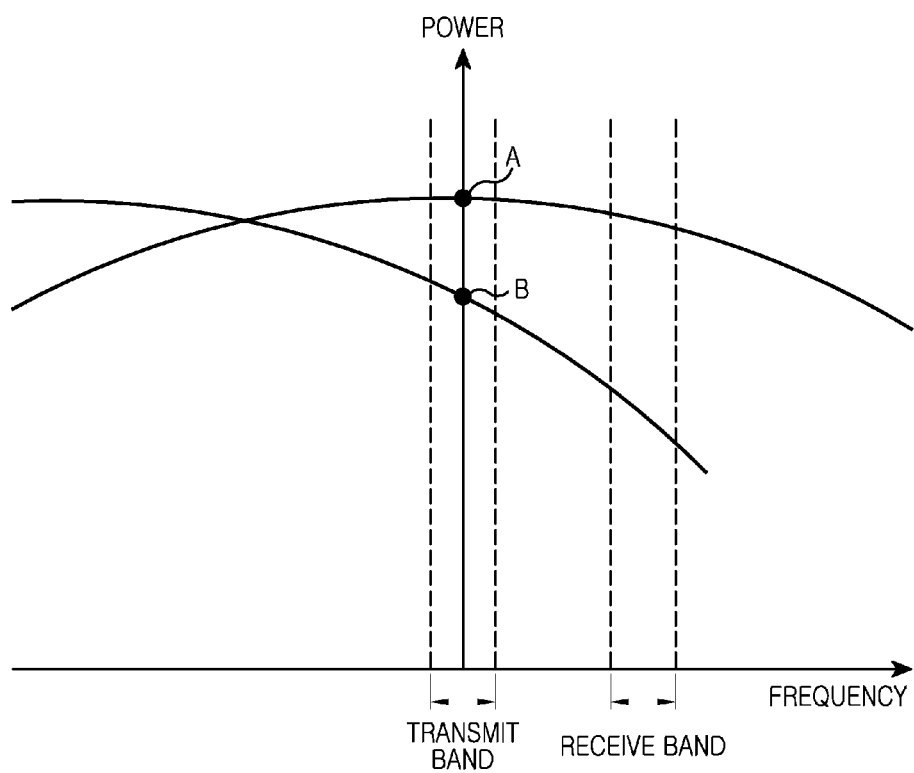
FIG. 1 illustrates a power variation caused by detuning according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to their bibliographical meanings, but are merely used by the inventor to enable a clear and consistent understanding of the invention. Accordingly, it should be apparent to those skilled in the art that the following description of exemplary embodiments of the present invention is provided for purposes of illustration only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention described hereinafter relate to a technique for performing calibration for a transmitter which does not have a Surface Acoustic Wave (SAW) filter (hereinafter, such a transmitter is also referred to as a SAW-less transmitter). In other words, exemplary embodiments of the present invention described below relate to a technique for simultaneously calibrating a noise and output power of a transmitter Radio Frequency (RF) circuit so that a strict noise requirement requested by a communication standard is satisfied even after removing a fixed frequency SAW filter located between an external Power Amplifier Module (PAM) and an output of the RF circuit in a portable terminal.

In a case of an RF circuit developed without additional establishment of a noise measurement, a level of reception sensitivity deterioration may be about 10 dB in a state of removing the SAW filter. In general, the reception sensitivity deterioration of about 10 dB is a level at which a basic communication standard can not be satisfied at all. When implementing the transmitter RF circuit, a calibration method based on a semiconductor process and a Process, Voltage, Temperature (PVT) variation is as important as the circuit design itself, and its importance is more significant in the case of a SAW-less transmitter considered in the present invention. The RF circuit can be referred to as an RF Integrated Circuit (RFIC).

In case of calibration for the conventional transmitter which is used under the premise that the SAW filter is included, calibration for an output power has been emphasized in general. Conventionally, the transmitter to be subjected to calibration has a structure in which an RF circuit, a SAW filter, and a PAM are connected. An output power of the RF circuit is regulated by using a control signal provided from a calibration unit to correct the output power. Since it is premised that the SAW filter is applied, management of a noise generated in the RF circuit has not been achieved. Therefore, the conventional calibration for which the use of the SAW filter is premised is not suitable for the transmitter for which the removal of the SAW filter is premised.

In case of the SAW-less transmitter, since the SAW filter must be removed, there is a need for a calibration method capable of simultaneously satisfying an output power and an output noise after the calibration process ends. Exemplary embodiments of the present invention propose a calibration method capable of satisfying a requirement of a mobile communication system while removing a SAW filter in a transmitter RF circuit. In order to remove the SAW filter, a noise level within a receive band must not be increased even in a state of not using the SAW filter.

Unlike the conventional technique, exemplary embodiments of the present invention are characterized in that the RF circuit of the SAW-less transmitter is used. In addition, exemplary embodiments of the present invention are also characterized in that a signal for out-of-band noise estimation is estimated as a newly defined process in addition to an output power correction signal which is input to the RF circuit from a calibration unit. That is, exemplary embodiments of the present invention include a function for predicting a noise floor of an RF circuit output signal which is input to a PAM and for actively controlling the noise floor. In addition, exemplary embodiments of the present invention are characterized in that an intentional detuning process in which an operating point inside the RF circuit is artificially moved is performed in order to decrease the out-of-band noise floor. Accordingly, the calibration unit outputs a control signal for intentional detuning. The intentional detuning decreases not only a signal strength but also a noise floor included in a signal by attenuating a final output of the transmitter RF circuit. According to the aforementioned characteristics, exemplary embodiments of the present invention perform calibration while simultaneously managing an output power and an output noise, and this can be referred to as Simultaneous Noise and output Power Calibration (SNPC).

Calibration according to exemplary embodiments of the present invention aims to allow an output power to come close to a target value while suppressing the increase of a noise of the transmitter RF circuit as much as possible. Ultimately, exemplary embodiments of the present invention provide a process for maximizing a total Carrier to Interference and Noise Ratio (CINR) of the SAW-less transmitter, and are implemented by using an attenuation method in which the voltage swing of an inner-circuit node is maximized and the target value of the output power can minimize the rising of the output noise floor. For this, exemplary embodiments of the present invention propose intentional detuning for a resonance frequency.

In general, the resonance frequency is configured to be located in an operating frequency, i.e., a center of a transmit band, so that a maximum power is exerted in the transmit band. However, the intentional detuning allows the resonance frequency to be intentionally deviated from the center of the operating frequency instead of being located in the center of the operating frequency. Due to the intentional detuning, the rising of the output noise can be suppressed in comparison with the conventional attenuation method using a resistance. Further, since a noise power can be decreased, the intentional detuning is very suitable for implementation of the SAW-less transmitter. For example, the resonance frequency controlled by the intentional detuning may be a resonance frequency of BALance/UNbalance (BALUN). The BALUN can be referred to as a matching transformer.

FIG. 1 illustrates a power variation caused by detuning according to an exemplary embodiment of the present invention.

Referring to FIG. 1, a point A indicates a state in which a resonance frequency before detuning is located within an operating band, and a point B indicates a state in which the resonance frequency varies by using detuning and is a target power value. As illustrated in FIG. 1, a power of a transmit band is decreased by moving the resonance frequency in an opposite direction of a receive band. In addition, an out-of-band noise generated in the receive band is decreased. In this case, if the power is attenuated by using a resister circuit, a power decrease amount at the transmit band is equal to a noise decrease amount at the receive band, and a noise caused by the resistor circuit is added. However, according to a result obtained by changing the resonance frequency without the use of the resister circuit, there is no additional noise caused by the resister circuit, and the noise decrease amount at the receive band is greater than the power decrease amount at the transmit band. Unlike FIG. 1, if the receive band is lower than the transmit band, the resonance frequency can be changed to be higher than a center frequency of the transmit band.

As illustrated in FIG. 1, since an output at the transmit band is decreased, a maximum output of the actual RF circuit needs to have a margin for gain by considering a difference between the point A and the point B. That is, the RF circuit is preferably designed to have the margin for gain in a worst-case condition corresponding to a minimum gain among all possible Process, Voltage, Temperature (PVT) conditions.

An output of the RF circuit may be an output of a Pre-Power Amplifier (PPA) included in the RF circuit. In order to implement the SAW-less transmitter, a maximum CINR is maintained by implementing a maximum voltage swing in a previous step of the PPA, and thus, if the transmitter has an insufficient gain, it is not possible to compensate for the insufficient gain by amplifying an input signal of the PPA. Therefore, the PPA is preferably designed to have a margin for a gain in a worst-case condition corresponding to a minimum gain among all possible PVT conditions. For example, the worst-case condition is a Slow Slow (SS) process, +100 degree condition. In case of the SS process condition, a gain overshoot phenomenon may occur at a bias condition of a PPA which operates in a class AB mode due to the increase in a threshold voltage of a Metal-Oxide Semiconductor Field-Effect Transistor (MOSFET) with respect to another process condition. In addition, in case of a Fast Fast (FF) process, a gain increase phenomenon may occur due to the decrease in the threshold voltage of the MOSFET. Therefore, it is required to control a bias current according to an operating condition in which the gain overshoot does not occur. If the bias current is increased to prevent the gain overshoot in the SS process condition, a gain is increased and thus there is an advantage in that a gain variation range of the PPA caused by an overshoot is decreased in the FF process condition. In case of the worst-case condition design, an output power may correspond to the point A which is greater than a calibration target value, that is, the point B of FIG. 1. An output is changed from the point A to the point B according to the aforementioned detuning.

Since an output noise at a receive frequency domain is important from the perspective of the SAW-less transmitter, the aforementioned intentional detuning in which a gain of the receive band is additionally decreased is effective in the suppressing of the output noise. However, if a Q-factor of a BALUN resonator is great, compensation is necessary by using pre-emphasis since a flatness of the gain may become worse. That is, although there is a shortcoming in that compensation of the gain flatness is necessary by using the intentional detuning, the shortcoming can be overcome by means of digital pre-emphasis, etc.

Figure 2:
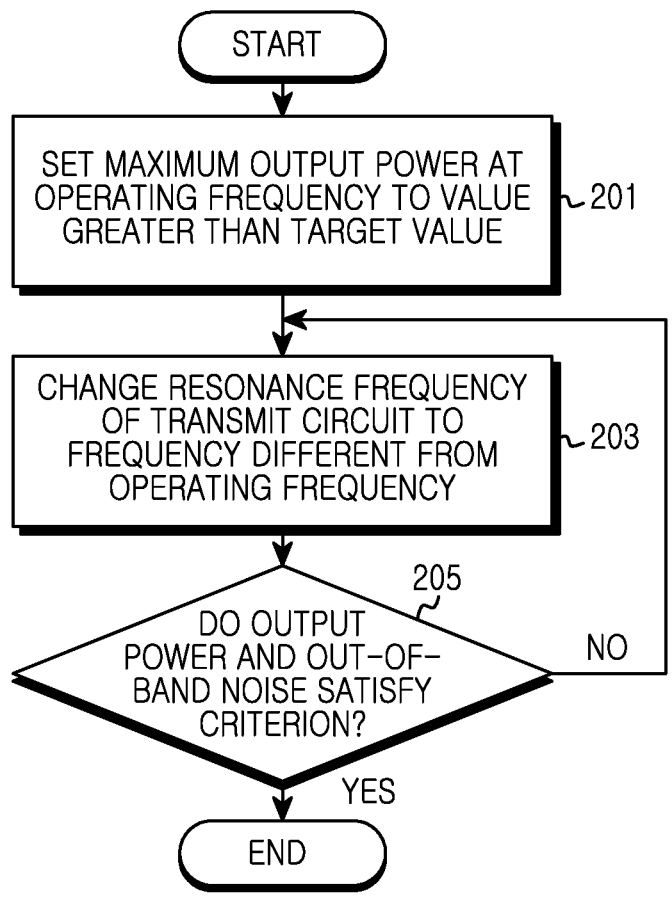
FIG. 2 illustrates a detuning process according to an exemplary embodiment of the present invention.

FIG. 2 illustrates a detuning process according to an exemplary embodiment of the present invention.

Referring to FIG. 2, a calibration unit sets a maximum output power at an operating frequency to a value greater than a target value in step 201. For this, an RF circuit of a transmitter needs to be designed such that an output power and a noise satisfy a requirement in the worst-case condition. That is, the calibration unit controls the RF circuit so that the output power of the RF circuit is maximized. For example, the calibration unit provides an input code for maximizing output swing to a Digital-to-Analog Converter (DAC) in the transmitter, maximizes voltage swing of a BaseBand Amplifier (BBA), and maximizes a linearity condition of a mixer and a PPA. Further, the calibration unit controls a resonance frequency of a transmit circuit to be equal to the operating frequency.

In step 203, the calibration unit changes the resonance frequency of the transmit circuit to a frequency different from the resonance frequency. The transmit circuit includes a variable reactance element, and the calibration unit can change the resonance frequency by regulating a reactance value of the element. That is, a detuning signal which is output from the calibration unit includes a signal for controlling a reactance value of the variable reactance element included in the RF circuit. Herein, the reactance includes at least one of an inductance and a capacitance. In this case, if a receive band is higher than a transmit band, the calibration unit changes the resonance frequency to a lower frequency. On the other hand, if the receive band is lower than the transmit band, the calibration unit changes the resonance frequency to a higher frequency.

In step 205, the calibration unit determines whether an output power and an out-of-band noise satisfy a criterion. That is, as a result of changing the resonance frequency of the transmit circuit, the maximum output power at the operating frequency is decreased, and the out-of-band noise at the receive band is also decreased. Therefore, the calibration unit determines whether the output power and the out-of-band noise are decreased to the extent that satisfies a pre-defined criterion. If the criterion is not satisfied, returning to step 203, the calibration unit changes again the resonance frequency.

A precondition for applying the exemplary calibration of the present invention is that a mixer and a PPA are designed such that an output noise and an output power satisfy a required standard in the worst-case condition of an operation of an RF circuit. In this case, according to an exemplary embodiment of the present invention, it is possible to implement a SAW-less transmitter by controlling a target value of the output power in such a manner that the power and the noise are attenuated by using the aforementioned intentional detuning.

The structure of the transmitter described as an example of the present invention can be simply expressed in a dependent access form of the mixer, the PPA, and the BALUN except for a DAC and a Low Pass Filter (LPF), as illustrated in FIG. 1. From the perspective of the SAW-less transmitter, the worst-case condition is a PVT condition in which a voltage gain of the mixer and the PPA is the lowest only when an output noise and an output power are determined under the condition that the output noise is not increased and the output power can be calibrated. When based on a simulation result of a building block inside the RF circuit of the transmitter, there is no case where gain characteristics of the mixer and the PPA are opposite to each other, and a gain variation characteristic is identical with respect to a PVT variation. Therefore, it is apparent that the worst-case condition of a transmitter chain is an SS, +100 degree condition from the perspective of a noise characteristic. If the mixer and PPA designed in this condition satisfy a cascaded output power condition and a cascaded output noise condition, it implies that a margin exists in a design for all PVT conditions and the SAW-less transmitter can be implemented by applying calibration using the intentional detuning method.

The calibration proposed in exemplary embodiments of the present invention basically includes intentional detuning of BALUN as described above. The intentional detuning controls the transmitter RF circuit in an attenuation manner which does not cause the increase of the output noise in all PVT conditions. For this, the intentional detuning is applied only at a final output node of the transmitter RF circuit, and a voltage swing of a signal at a previous node must be maximized in a range in which a CINR does not deteriorate. Therefore, since a dynamic range for the intentional detuning can be ensured only when maximizing not only an input/output of the mixer but also a voltage swing at the output node of the BBA, the LPF, and the DAC, it is required to ensure linearity of a mixer having the largest possible size. For example, a voltage-mode 25%-duty-cycle sampling mixer has an optimal characteristic with respect to the aforementioned condition. That is, since the voltage-mode 25%-duty-cycle sampling mixer has a simple circuit structure, there is little variation in a conversion gain under the PVT condition, and it is advantageous to ensure higher linearity. However, since a mixer circuit itself is located inside a transmitter which cannot be directly measured from an external side of the circuit, calibration is impossible through a direct access from the external side. Therefore, a concern in the design of the mixer circuit is to maintain linearity as robust as possible with respect to the PVT condition variation. However, a characteristic variation depending on the PVT condition of the mixer is partially inevitable, and a gain variation with respect to the PVT variation under the maximum linearity condition of the mixer needs to be compensated for through intentional detuning of the PPA and the BALUN. Therefore, the PPA design condition must be added by a size corresponding to a PVT gain variation of the mixer in the worst-case condition of the PPA gain.

Figure 3:
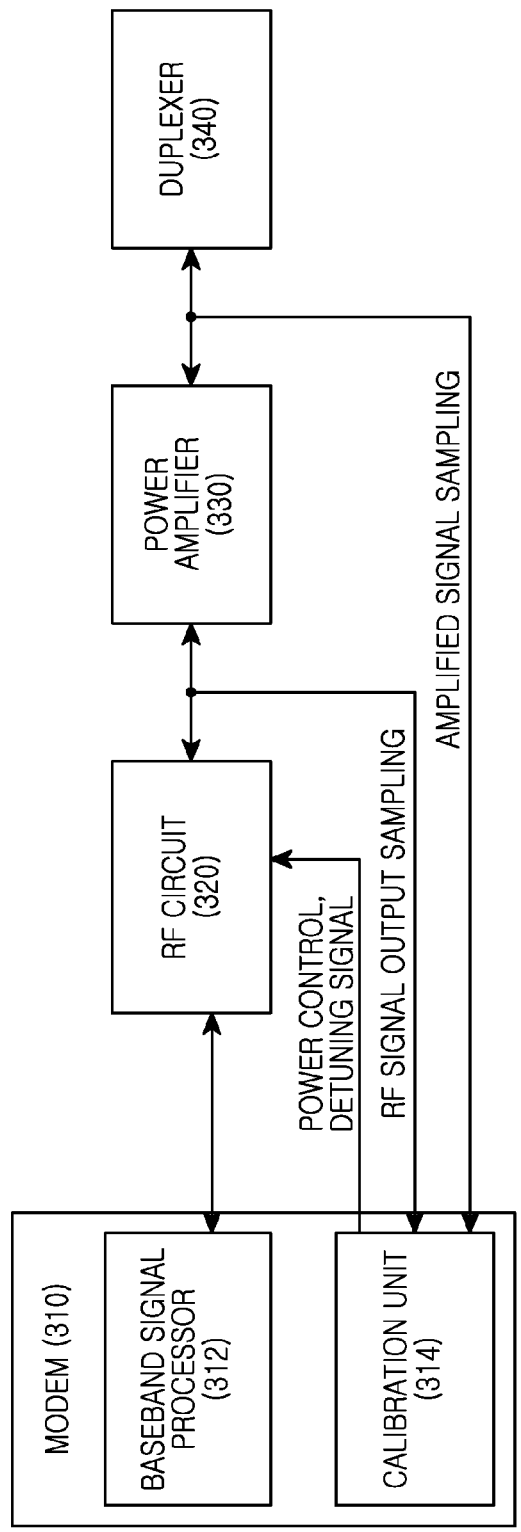
FIG. 3 is a block diagram of a transmitter in a communication device according to an exemplary embodiment of the present invention.

FIG. 3 is a block diagram of a transmitter in a communication device according to an exemplary embodiment of the present invention.

Referring to FIG. 3, the transmitter includes a modem 310, an RF circuit 320, a power amplifier 330, and a duplexer 340.

The modem 310 includes a baseband signal processor 312 and a calibration unit 314. The baseband signal processor 312 converts data into a baseband signal. That is, the baseband signal processor 312 generates the baseband signal by coding and modulating transmission data. When using an Orthogonal Frequency Division Multiplexing (OFDM) scheme, the baseband signal processor 312 can further perform an Inverse Fast Fourier Transform (IFFT) operation.

The calibration unit 314 controls a calibration process according to exemplary embodiments of the present invention. That is, the calibration unit 314 provides a power control signal and a detuning signal to the RF circuit 320, and measures noise by using a sampling signal of an output of the RF circuit 320 and the power amplifier 330. The detuning signal is a signal for controlling a resonance frequency of the RF circuit 320. More specifically, the detuning signal controls a reactance value of a variable reactance element in the RF circuit 320.

The RF circuit 320 converts the baseband signal generated by the modem 310 into an analog signal, controls a gain of the signal, and converts the signal into an RF signal. Further, the RF circuit 320 converts a balanced signal into an unbalanced signal. Furthermore, the RF circuit 320 is calibrated under the control of the calibration unit 314. The power amplifier 330 amplifies a power of the RF signal which is output from the RF circuit 320. The duplexer 340 processes a duplex function for transmission and reception. An exemplary RF circuit is illustrated in FIG. 4.

Figure 4:
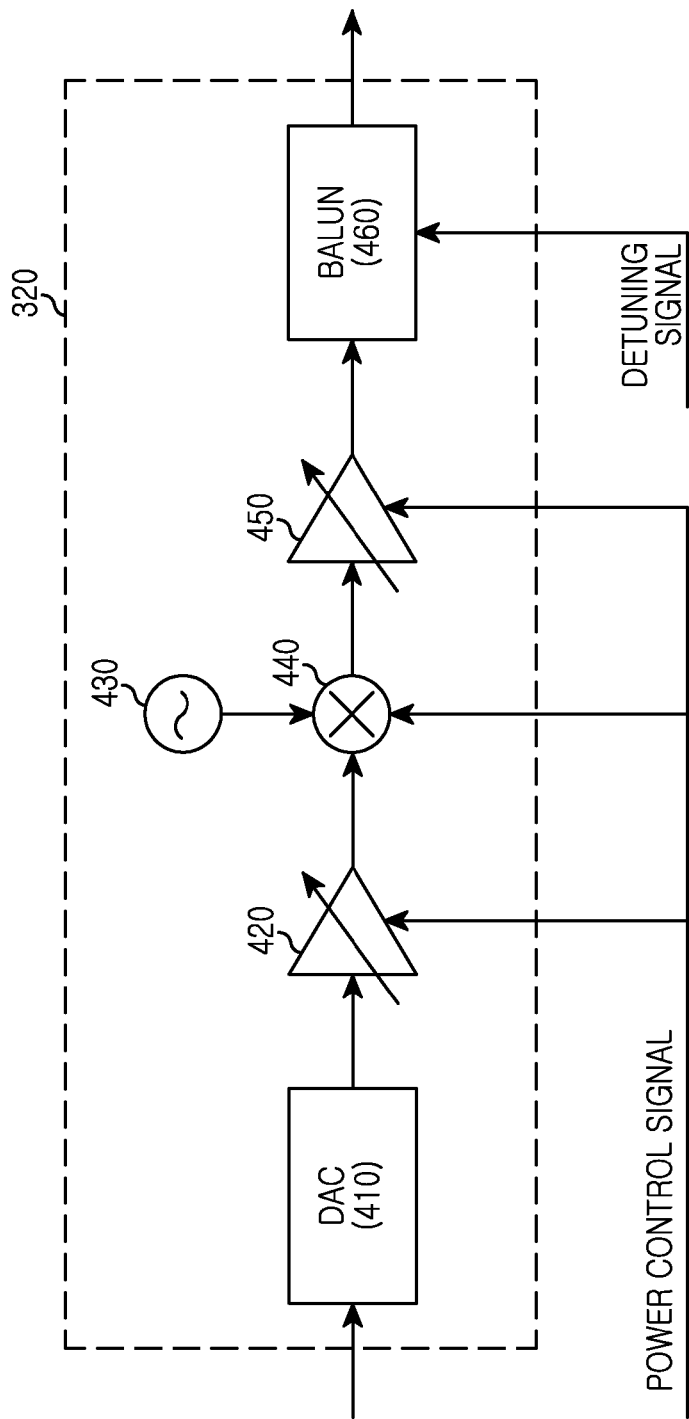
FIG. 4 is a block diagram of a Radio Frequency (RF) circuit of a communication device according to an exemplary embodiment of the present invention.

FIG. 4 is a block diagram of an RF circuit of a communication device according to an exemplary embodiment of the present invention. Although only functional blocks related to calibration are illustrated in the structure of FIG. 4, the RF circuit may further include additional blocks other than the blocks illustrated in FIG. 4.

Referring to FIG. 4, the RF circuit 320 includes a DAC 410, a BBA 420, a resonator 430, a mixer 440, a PPA 450, and a BALUN 460. The DAC 410 converts a digital baseband signal provided from the modem 310 into an analog signal. The BBA 420 controls a gain of the baseband signal. The PPA 450 controls a gain of an RF signal. The mixer 440 generates an RF signal corresponding to the baseband signal by using a frequency signal provided from the resonator 430. The BALUN 460 converts a balanced signal into an unbalanced signal. Herein, a gain of the BBA 420 and a bias of the mixer 440 and the PPA 450 are controlled according to the power control signal. The BALUN 460 includes a variable reactance element. A reactance value of the reactance element is controlled by the detuning signal. As a result, a resonance frequency of the BALUN 460 can vary. An exemplary operation of the calibration unit 314 will be described in more detail with reference to FIG. 5.

Figure 5:
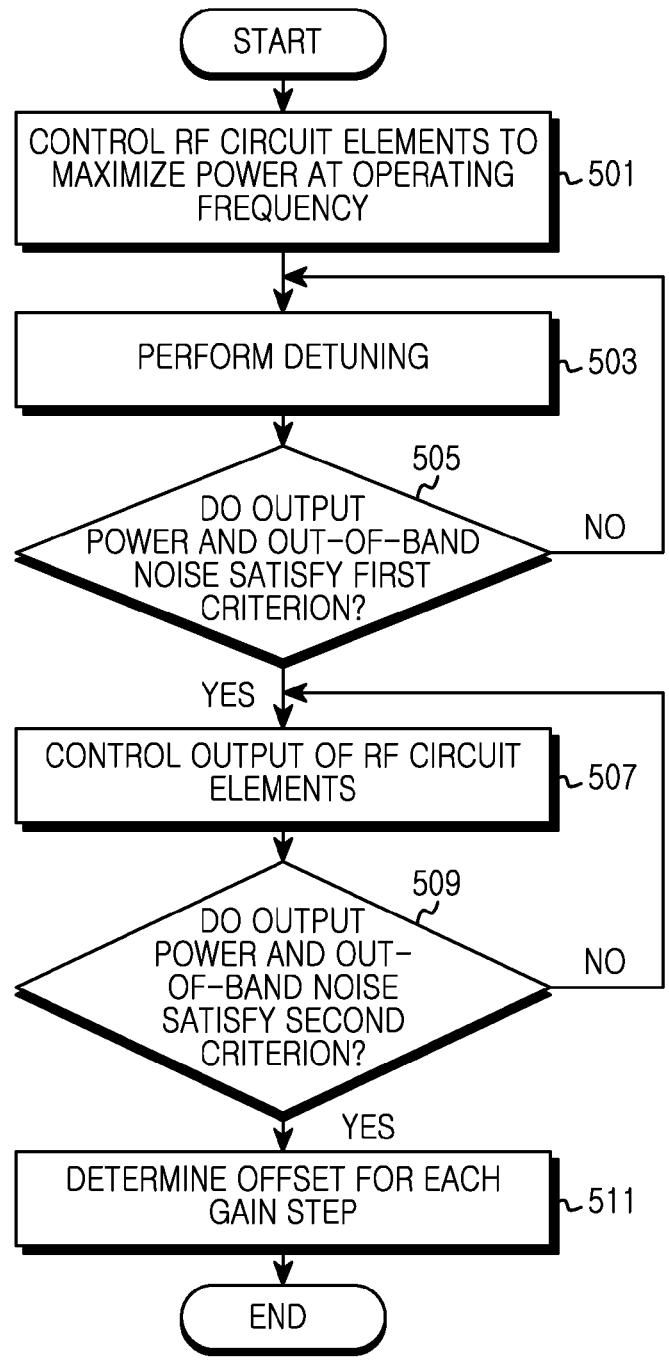
FIG. 5 is a flowchart of a calibration process of a transmitter in a communication device according to an exemplary embodiment of the present invention.

FIG. 5 is a flowchart of a calibration process of a transmitter in a communication device according to an exemplary embodiment of the present invention.

Referring to FIG. 5, the calibration unit 314 controls elements of the RF circuit 320 so that an output power at an operating frequency is maximized in step 501. For this, the RF circuit 320 needs to be designed such that an output power and a noise satisfy a required standard in the worst-case condition. For example, the calibration unit 314 provides an input code for maximizing output swing to the DAC 410, controls a gain to maximize voltage swing of the BBA 420, and provides a bias for maximizing a linearity condition to the mixer 440 and the PPA 450. Further, the calibration unit 314 provides control such that a resonance frequency of the BALUN 460 coincides with the operating frequency.

In step 503, the calibration unit 314 performs detuning on the resonance frequency. The detuning of step 503 can be referred to as coarse power control. The detuning implies that the resonance frequency of the BALUN 460 is changed to a value different from the operating frequency. That is, the calibration unit 314 can change the resonance frequency by controlling a reactance value of a variable reactance element in the BALUN 460. In this case, if a receive band is higher than a transmit band, the calibration unit 314 changes the resonance frequency to a lower frequency. Otherwise, if the receive band is lower than the transmit band, the calibration unit 314 changes the resonance frequency to a higher frequency. Accordingly, an output power of the operating frequency is decreased, and at the same time, an out-of-band noise of the receive band is also decreased. That is, the RF circuit 320 outputs an out-of-band noise and a transmit signal with a relatively lower power than that of a case where the resonance frequency and the transmit operating frequency coincide with each other.

In step 505, the calibration unit 314 determines whether the output power and the out-of-band noise satisfy a first criterion. That is, the calibration unit 314 measures at least one of an output power of the RF circuit 320, an out-of-band noise of the RF circuit 320, and an output power of the power amplifier 330, and determines whether the output power and the out-of-band noise are decreased to the extent that satisfies the pre-defined first criterion. If the first criterion is not satisfied, returning to step 503, the calibration unit 314 again performs the detuning.

Otherwise, if the first criterion is satisfied, proceeding to step 507, the calibration unit 314 controls an output of elements in the RF circuit 320. Output control of step 507 can be referred to as fine power control. More specifically, the calibration unit 314 precisely controls an output power required by a standard by controlling an input code of the DAC 410, a gain of the BBA 420, or the like. When an LPF is included in the RF circuit 320, the LPF can also be included in a target of the precise power control. Further, the calibration unit 314 can also control the gain of the PPA 450. In other words, the calibration unit 314 performs additional power control by changing at least one control value among values of the elements in the RF circuit 320.

In step 509, the calibration unit 314 determines whether the output power and the out-of-band noise satisfy a second criterion. That is, the calibration unit 314 measures at least one of an output power of the RF circuit 320, an out-of-band noise of the RF circuit 320, and an output power of the power amplifier 330, and determines whether the output power and the out-of-band noise are included in a range that satisfies the pre-defined second criterion. If the second criterion is not satisfied, returning to step 507, the calibration unit 314 again performs the output control.

Otherwise, if the second criterion is satisfied, proceeding to step 511, the calibration unit 314 determines an offset for each gain step. More specifically, the calibration unit 314 changes a gain of the BBA 420 and the PPA 450 step-by-step. In this case, the calibration unit 314 measures an output power at each step, and thereafter determines an offset of each step according to a difference value between the measured value and a value required by the design. A resonance frequency value which satisfies the first criterion of step 505 or a reactance value corresponding to the resonance frequency, a setup value of elements which satisfy the second criterion of step 509, and step-wise offset values determined in step 511 are stored as a calibration result. The calibration result can be stored in the form of a Look Up Table (LUT).

It is reasonable to consider calibration depending on a temperature variation of the exemplary calibration of the present invention by differentiating with a process and voltage variation. It can be assumed that the process and the voltage do not vary when a specific condition is determined, but a temperature is a factor which can vary during an operation of the RF circuit. Therefore, instead of directly performing the calibration depending on the temperature variation, it is possible to use a method in which the LUT is replaced depending on the temperature variation by applying a temperature coefficient which is statistically reliable and which is obtained through sufficient samples. Since +100 degree, which is a maximum operating temperature of the RF circuit, is assumed in the worst-case condition of the circuit design, an output power calibration process of the PPA can always remain in an attenuation state even in case of the temperature variation, and the rising of a noise floor is persistently suppressed.

An exemplary method of considering and accommodating the temperature variation will be described. A variation of a transmitter output power is about up to 3 dB according to a maximum temperature variation of −40 degree to +100 degree. When assuming −20 degree to +65 degree, which is a more practical operating temperature range corresponding to an actual operating temperature of a portable terminal, a performance variation may be less than or equal to 1 dB to 2 dB. Such a variation can be precisely implemented by increasing or decreasing a gain of the DAC and the BBA without a significant deterioration of a CINR characteristic inside the circuit.

In summary, an output power variation with a relatively great range and depending on a process variation and a voltage variation corresponds to coarse calibration, and is implemented by achieving a target value by using intentional detuning of PPA/BALUN. An output power variation depending on a temperature variation can be precisely implemented through minute control of an amplitude or a gain of DAC/BBA/filter by using fine calibration.

By using detuning which changes a resonance frequency of an RF circuit in a communication device, an output power can be approximated to a target while suppressing the increase of a noise floor of a transmitter RF circuit as much as possible. That is, in order to maximize an overall Carrier-to-Noise Ratio (CNR) of the transmitter RF circuit, exemplary embodiments of the present invention are implemented by using an attenuation method in which a voltage swing of an internal node is maximized and an output power can minimize the increase of the noise floor. Accordingly, a transmitter which does not have a SAW filter which filters an output of the RF circuit to a transmit band can be implemented, and thus a size and manufacturing cost of the transmitter can be significantly decreased.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:
1. A communication apparatus, the apparatus comprising:
a calibration unit configured to output a detuning signal by which a resonance frequency of a Radio Frequency (RF) circuit is detuned with respect to a transmit operating frequency; and
an RF unit configured to change the resonance frequency based on the detuning signal and configured to output an out-of-band noise and a transmit signal having a relatively lower power than that of a case where the resonance frequency and the transmit operating frequency are tuned to each other.

2. The apparatus of claim 1, wherein the detuning signal comprises a signal for controlling a reactance value of a variable reactance element included in the RF circuit.

3. The apparatus of claim 1, wherein the RF circuit is further configured to change a resonance frequency of BALance-UNbalance (BALUN) included in the RF circuit according to the detuning signal.

4. The apparatus of claim 1, wherein the calibration unit is further configured to output the detuning signal which changes the resonance frequency to a lower frequency when the receive frequency band is higher than the transmit frequency band, and to output the detuning signal which changes the resonance frequency to a higher frequency when the receive frequency band is lower than the transmit frequency band.

5. The apparatus of claim 1, wherein, before changing the detuning signal, the calibration unit is further configured to control the RF circuit such that an output power of the RF circuit is maximized.

6. The apparatus of claim 1, wherein, before changing the detuning signal, the calibration unit is further configured to control the RF circuit such that a maximum output power at the transmit operating frequency is greater than a target value.

7. The apparatus of claim 6, wherein the calibration unit is further configured to provide an input code for maximizing output swing to a Digital-to-Analog Converter (DAC) in the RF circuit, to control a gain to maximize voltage swing of a BaseBand Amplifier (BBA) in the RF circuit, and to provide a bias for maximizing a linearity condition to a mixer and a Pre-Power Amplifier (PPA) in the RF circuit.

8. The apparatus of claim 1, wherein after the completion of power control using the detuning signal, the calibration unit is further configured to perform additional power control by changing at least one control value among values of elements in the RF circuit.

9. The apparatus of claim 8, wherein, after the completion of the additional power control, the calibration unit is further configured to determine an offset for each gain step and store the calibration result.

10. The apparatus of claim 9, wherein the calibration result includes at least one of the resonance frequency value, a reactance value corresponding to the resonance frequency, a setup value of elements in the RF circuit, and the step-wise offset values.

11. The apparatus of claim 1, further comprising:
a power amplifier configured to amplify a signal which is output to the RF circuit not subjected to band filtering.

12. A method for calibration of a communication device, the method comprising:
outputting a detuning signal by which a resonance frequency of a Radio Frequency (RF) circuit is detuned with respect to a transmit operating frequency;
changing the resonance frequency according to the detuning signal; and
outputting an out-of-band noise and a transmit signal having a relatively lower power than that of a case where the resonance frequency and the transmit operating frequency are tuned to each other.

13. The method of claim 12, wherein the detuning signal includes a signal for controlling a reactance value of a variable reactance element included in the RF circuit.

14. The method of claim 12, wherein the changing of the resonance frequency comprises changing a resonance frequency of BALance-UNbalance (BALUN) included in the RF circuit according to the detuning signal.

15. The method of claim 12, wherein the outputting of the detuning signal comprises:
outputting the detuning signal which changes the resonance frequency to a lower frequency when the receive frequency band is higher than the transmit frequency band; and
outputting the detuning signal which changes the resonance frequency to a higher frequency when the receive frequency band is lower than the transmit frequency band.

16. The method of claim 12, further comprising, before changing the detuning signal, controlling the RF circuit such that an output power of the RF circuit is maximized.

17. The method of claim 12, further comprising, before changing the detuning signal, controlling the RF circuit such that a maximum output power at the transmit operating frequency is greater than a target value.

18. The method of claim 17, wherein the controlling of the RF circuit such that a maximum output power at the transmit operating frequency is greater than a target value comprises:
providing an input code for maximizing output swing to a Digital-to-Analog Converter (DAC) in the RF circuit;
controlling a gain to maximize voltage swing of a BaseBand Amplifier (BBA) in the RF circuit; and
providing a bias for maximizing a linearity condition to a mixer and a Pre-Power Amplifier (PPA) in the RF circuit.

19. The method of claim 12, further comprising, after the completion of power control using the detuning signal, performing additional power control by changing at least one control value among values of elements in the RF circuit.

20. The method of claim 19, further comprising:
after the completion of the additional power control, determining an offset for each gain step; and
storing the calibration result.

21. The method of claim 20, wherein the calibration result includes at least one of the resonance frequency value, a reactance value corresponding to the resonance frequency, a setup value of elements in the RF circuit, and the step-wise offset values.

22. The method of claim 12, further comprising amplifying a signal which is output to the RF circuit not subjected to band filtering.

* * * * *